Figure 2A:
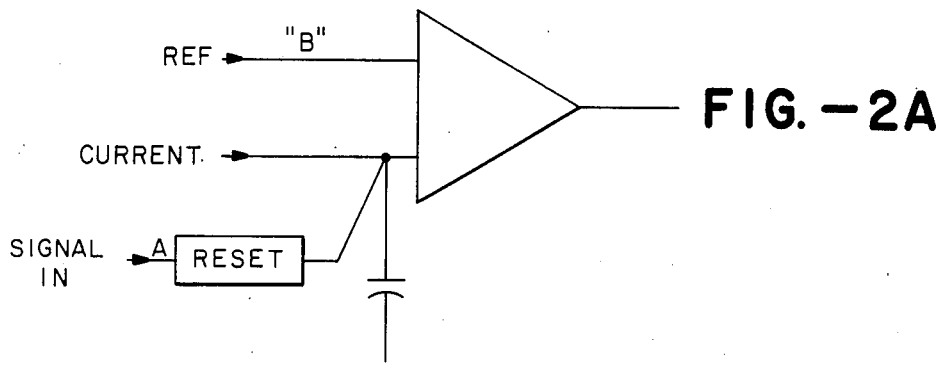

United States Patent [19]

Smith

[11] Patent Number: 4,682,252

[45] Date of Patent: Jul. 21, 1987

[54] METHOD AND APPARATUS FOR EVALUATING A RECORDING SYSTEM UTILIZING A PROGRAMMABLE WINDOW GENERATOR HAVING FIRST AND SECOND MULTIVIBRATORS PROVIDING DELAY

[75] Inventor: Robert F. Smith, Santa Clara County, Calif.

[73] Assignee: Seagate Technology, Scotts Valley, Calif.

[21] Appl. No.: 803,732

[22] Filed: Dec. 2, 1985

[51] Int. Cl.⁴ .................... G11B 27/00; G11B 5/02; H03K 5/159

[52] U.S. Cl. ............................ 360/67; 307/511; 324/212; 328/55; 328/207

[58] Field of Search ............. 324/210, 212; 360/51, 360/53, 67; 307/234, 511; 328/55, 207

[56] References Cited

U.S. PATENT DOCUMENTS

| | | |
|---|---|---|
| 3,199,094 | 8/1965 | Bakshi .................................. 360/51 |
| 3,202,769 | 8/1965 | Coleman ........................... 328/55 X |
| 3,368,152 | 2/1968 | Jorgensen ....................... 328/207 X |
| 3,417,337 | 12/1968 | Prasil ................................ 307/511 X |
| 3,921,213 | 11/1975 | McGrath et al. ...................... 360/51 |
| 4,394,695 | 7/1983 | Mahon .................................. 360/53 |
| 4,578,721 | 3/1986 | Brannan ............................ 360/53 X |

Primary Examiner—Gerard R. Strecker
Attorney, Agent, or Firm—Flehr, Hohbach, Test, Albritton & Herbert

[57] ABSTRACT

A system for evaluating a recording system is disclosed, which includes a monostable multivibrator (MMV) for receiving the recovered data stream from the disc drive. The time constant of the MMV is controlled by a second, matched MMV which receives a fixed frequency input. By applying the output of this matched MMV to another input of the MMV receiving the recovered data, the time constant of the first multivibrator may be adjusted with the delay being a function of the period of the input frequency to the second multivibrator.

5 Claims, 4 Drawing Figures

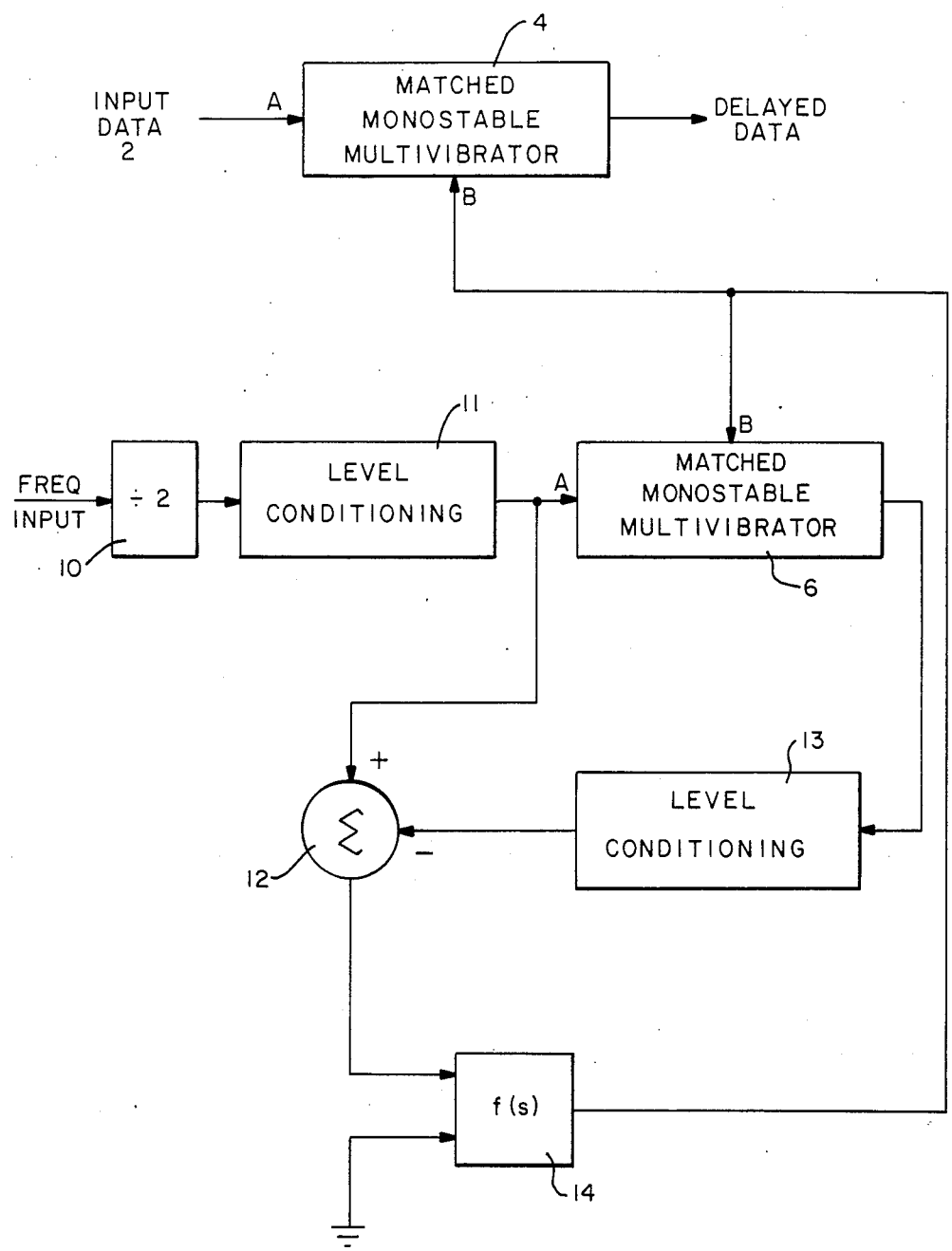
FIG. —1

METHOD AND APPARATUS FOR EVALUATING A RECORDING SYSTEM UTILIZING A PROGRAMMABLE WINDOW GENERATOR HAVING FIRST AND SECOND MULTIVIBRATORS PROVIDING DELAY

This invention relates generally to method and apparatus for evaluating a magnetic recording system.

The bit error rate in digital magnetic recording systems is a measure of their performance. It may be defined as the fraction of bits detected in a bit stream that differ from those actually recorded on the recording medium and read therefrom. The bit error rate arises from defects in the system such as adjacent track pickup, poor tracking, etc.

Generally, data is recorded in serial intervals with one bit in each interval. When the data is read back, the associated circuits provide a window for each bit. According to one common scheme, a pulse detected in the window is a one and no pulse is a zero. If the window is narrow, bits may not be detected because they will be shifted outside the window time interval. The recording system may be evaluated by measuring the error rate as a function of window size. Katz and Campbell describe the bit error rate in an article entitled "Effects of Bit Shift Distribution on Error Rate in a Magnetic Recording," IEEE Transactions on Magnetics, Volume MAG-15, No. 3, May, 1979. They describe a process for evaluating a recording system by using a data separator that runs at the data clocking rate and has an adjustable window width. The bits that fall outside the window are counted as errors. This information is then used to predict the recording system error rate since a direct measure of error rate cannot be made in a reasonable time.

In order to obtain a measure of the error rate, tests must be run at a number of window widths. In the prior art, this has been done sequentially, requiring a considerable amount of time to completely test a recording apparatus.

It is an objective of the present invention to provide an improved method and apparatus for evaluating recording systems.

It is another objective of the present invention to provide an apparatus and method in which the relative positioning of the data bit and the window are both electronically adjustable.

In prior known systems, a discrete tapped delay line has been used to provide the various delays between the time the data is actually recorded and the leading and trailing edges of the window. See for example U.S. Pat. No. 4,394,695, incorporated herein by reference. Such delay lines are bulky, costly, and must be physically changed in order to realize a different data rate. Alternatively, a tapped delay line may be used to provide data bits representations of the data bit at different clock intervals, but such an alternative is also a costly approach. Such delay lines also exhibit errors in absolute delay, as well as a fairly large temperature coefficient in their delay.

It is an objective of the present invention to provide an alternative to the physical delay lines used in the prior art.

The foregoing and other objects of the invention are achieved by a system for evaluating a recording system which includes a monostable multivibrator (MMV) for receiving the recovered data stream from the disc drive. The time constant of the MMV is controlled by a second, matched MMV which receives a fixed frequency input. By applying the output of this matched MMV to another input of the MMV receiving the recovered data, the time constant of the first multivibrator may be adjusted with the delay being a function of the period of the input frequency to the second multivibrator.

Figure 2B:
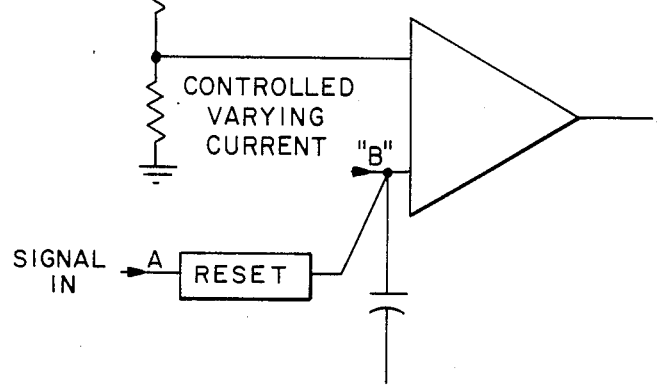
Figure 2C:
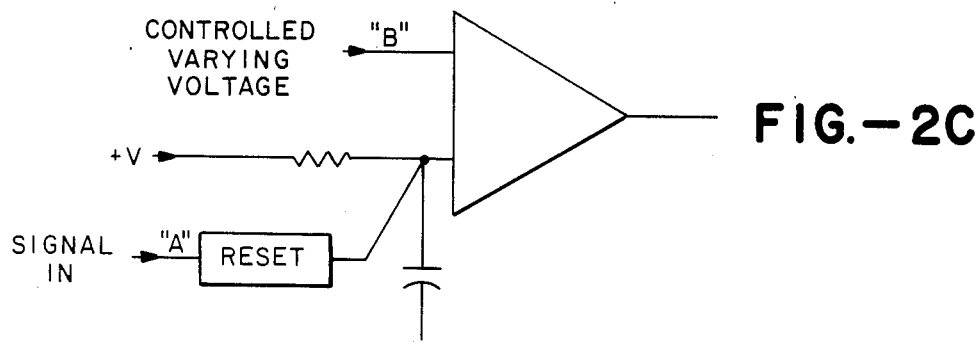

The objectives and advantages of the present invention will be more clearly understood from the following description taken in connection with the accompanying drawings in which:

FIG. 1 is a block diagram of a programmable data delay system in accordance with the present invention; and FIGS. 2A-2C comprise alternative embodiments of the matched MMV utilized in the block diagram of FIG. 1.

As described above, a recording system is evaluated by measuring the error rate as a function of data window size or width. The information is obtained by evaluating the data read from the data storage device within a separately generated window; the system looks to see whether a significant edge of the data (the leading or trailing edge) occurs within the time window. Bits whose significant edge fall outside the window are counted as errors. Differing delays may be applied to the data read from the storage device to check the accuracy of the data read under different conditions. The present invention comprises a means for delaying the data by a fixed amount which may be programmably modified so that a window of constant width may be generated and the data delayed by different amounts to see if it can be still detected within the window. Window generators are well known and have been described for example in U.S. Pat. No. 3,810,234 incorporated herein by reference.

Given that the window has been generated, it is then necessary to make a decision on the presence or absence of a bit of recovered data, by checking to see whether its significant edge falls within the generated window. In the present system, the input data recovered from the disc drive is applied to input A of a MMV 4. Various configurations of MMVs are shown in FIGS. 2A, 2B and 2C. In each of these figures, the two inputs to the MMV are marked as inputs A, B to correspond to the letters which appear on the drawings. No further explanation of the design of an MMV is believed to be necessary, as such designs are well within the skill of the art at the present time.

In accordance with the present invention, the significant edge, i.e., either leading or trailing edge of each pulse of input data received at input A of MMV 4 is delayed according to the control signal received at input B. This control signal is generated using a second MMV 6 which is of matched construction to the first MMV 4. The delay in time of the significant edge is fixed by the feedback loop which is connected to this second MMV 6.

Specifically, a fixed frequency input 10 is provided and after appropriate signal conditioning 11 applied to input A of second MMV 6. The delay time desired is the period (or 1/input frequency) applied to this input A of MMV 6. The input of the MMV is applied after appropriate level conditioning 13 to a differencing device 12 which receives as its other input the input frequency 10. The difference between these two signals is applied to an appropriate gain stabilizing device 14 and then to the feedback input B of the MMV 6. The larger the gain of the device 14, the closer the period of delay will be to the input frequency period.

This same feedback loop is coupled to both control inputs of the matched MMVs. Accordingly, the significant edge of each input data pulse received by MMV 4 will be delayed by the period of the input frequency to MMV 6. Therefore, by modification of this input frequency 10, the leading or trailing edge which constitutes the significant edge of each data pulse can be controlled by varying amounts, thereby moving this edge of each detected pulse nearer to the leading or trailing edge of the window.

The output from this window match can be provided to a comparator (not shown) which compares the original data and the recovered data and provides a signal which is indicative of the error rate. This signal may be applied to an appropriate counter or used to plot a curve which is extended, as taught in the above incorporated article, to determine the intrinsic error rate. The more the delay in the data is modified from a pure 90° delay, the greater the error which will be detected in a marginally operating device.

Other features and advantages of the present invention will become apparent to a person of skill in the art who studies the subject invention disclosure. Therefore, the present invention is to be limited only by the scope of the following claims.

What is claimed:

1. A system for evaluating a disc drive having at least one disc storing data on a plurality of tracks by comparing data read back from said disc track to the edges of a fixed window, the data being selectively read from any one of the tracks, said system comprising a first monostable multivibrator having data input coupled to receive the data read from said any one of said disc drive tracks, and delay means for modifying the data rate output of said monostable multivibrator, said delay means comprising a second monostable multivibrator having an input receiving a fixed frequency signal, the output of said second monostable multivibrator being coupled to a control input of said first monostable multivibrator for controlling the time constant of the first monostable multivibrator, whereby the period of said fixed frequency to said second monostable multivibrator controls the delay of said first monostable multivibrator, the read data being delayed by varying degrees of time, and detected within said fixed window to evaluate the error rate of said disc drive.

2. A data separation device as in claim 1 wherein said delay means comprises a feedback loop including means for establishing a difference signal representing the difference between the frequency input signal to the second monostable multivibrator and the output of said second monostable multivibrator and means for coupling said difference signal to both said first and second monostable multivibrator.

3. A data separation device as claimed in claim 1 wherein said first and second MMVs are of matched component construction.

4. A method evaluating a recording system which includes recovering data selectively from tracks on said disc, passing the recovered data through a first monostable multivibrator to induce a controllable delay therein, and modifying said induced delay by applying to a control input of said first monostable multivibrator a signal comprising the difference between the output of a second monostable multivibrator of identical construction to said first monostable multivibrator and an input signal of known frequency fixing the frequency of said second monostable multivibrator, and reading the delayed recovered data output from said first multivibrator during a window of known time duration, the period of delay applied to recovered data passing through said first monostable multivibrator being controlled by the fixed frequency signal.

5. The method as claimed in claim 4 wherein said delay control signal is the difference between the output of said second monostable multivibrator and the signal fixing the frequency of said second monostable multivibrator.

* * * * *